US008953562B2

(12) United States Patent  (10) Patent No.: US 8,953,562 B2
Bachl et al.  (45) Date of Patent: Feb. 10, 2015

(54) METHOD OF USING UPLINK REFERENCE SIGNALS FOR ACCESS GRANT REQUESTS

(75) Inventors: Rainer Bachl, Nuremberg (DE); Fang-Chen Cheng, Randolph, NJ (US); Jung A. Lee, Pittstown, NJ (US); Lei Song, Randolph, NJ (US); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 1712 days.

(21) Appl. No.: 11/670,092

(22) Filed: Feb. 1, 2007

(65) Prior Publication Data

US 2008/0186911 A1  Aug. 7, 2008

(51) Int. Cl.
*H04B 7/216* (2006.01)
*H04W 74/08* (2009.01)
*H04L 27/26* (2006.01)
*H04L 25/02* (2006.01)

(52) U.S. Cl.
CPC ....... *H04W 74/0866* (2013.01); *H04L 27/2613* (2013.01); *H04L 25/0204* (2013.01)
USPC .......................................... 370/335; 370/329

(58) Field of Classification Search
None
See application file for complete search history.

(56) References Cited

U.S. PATENT DOCUMENTS

| 5,909,436 | A  | * | 6/1999  | Engstrom et al. | 370/343 |
| 6,901,116 | B1 | * | 5/2005  | Pines et al.    | 375/340 |
| 7,099,269 | B2 | * | 8/2006  | van Nee         | 370/208 |
| 2002/0080886 | A1 | * | 6/2002  | Ptasinski et al. | 375/295 |
| 2003/0076812 | A1 | * | 4/2003  | Benedittis      | 370/350 |
| 2003/0185174 | A1 | * | 10/2003 | Currivan et al. | 370/335 |
| 2004/0001429 | A1 | * | 1/2004  | Ma et al.       | 370/210 |
| 2005/0068931 | A1 | * | 3/2005  | Cho et al.      | 370/345 |
| 2005/0265430 | A1 | * | 12/2005 | Ozluturk et al. | 375/145 |
| 2006/0018336 | A1 | * | 1/2006  | Sutivong et al. | 370/437 |
| 2007/0058694 | A1 | * | 3/2007  | van Nee         | 375/142 |
| 2007/0211656 | A1 | * | 9/2007  | Kwak et al.     | 370/319 |
| 2007/0230600 | A1 | * | 10/2007 | Bertrand et al. | 375/260 |

OTHER PUBLICATIONS

International Search Report and Written Opinion mailed Jul. 24, 2008.
XP-002487901, 3GPP RAN WG1 #46, Tallinn, Estonia, Aug. 28-Sep. 1, 2006, *EUTRA SC-FDMA Uplink Pilot Reference Signal Design & TP*.
XP-002487902, 3GPP TSG RAN WG1 #44bis, Greece, Athens, Mar. 27-Mar. 31, 2006, R1-060879, Motorola, *Performance Comparison of Pilot/Reference Signal Structures for E-UTRA Uplink SC-FDMA*, Agenda Item: 10.2.1.

* cited by examiner

*Primary Examiner* — Jinsong Hu
*Assistant Examiner* — William Nealon
(74) *Attorney, Agent, or Firm* — Davidson Sheehan LLP

(57) ABSTRACT

The present invention provides a method and apparatus for using uplink reference signals for access grant requests. The method includes determining that at least one mobile unit is requesting access to at least one uplink channel based on information indicative of a change in a masking sequence applied to at least one reference signal. Another embodiment of the present invention includes providing a first reference signal modulated by a first masking sequence to indicate a request for access to at least one uplink channel.

20 Claims, 2 Drawing Sheets

METHOD OF USING UPLINK REFERENCE SIGNALS FOR ACCESS GRANT REQUESTS

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells or sectors, which may be grouped into one or more networks. Base stations provide wireless connectivity to the cells or sectors within the wireless communication system. Alternatively, wireless connectivity may be provided by access points, base station routers, access networks, and the like. Mobile units located in each cell may access the wireless communications system by establishing a wireless communication link, often referred to as an air interface, with the base station associated with the cell or sector. The mobile units may also be referred to using terms such as access terminal, user equipment, subscriber station, and the like. The mobile units may include devices such as mobile telephones, personal data assistants, smart phones, Global Positioning System devices, wireless network interface cards, desktop or laptop computers, and the like. The wireless communication link typically includes one or more downlink (or forward link) channels for transmitting information from the base station to the mobile unit and one or more uplink (or reverse link) channels for transmitting information from the mobile unit to the base station.

Each base station typically provides wireless connectivity to more than one mobile unit. Consequently, air interface resources are shared between the multiple mobile units. For example, mobile units may share one or more uplink channels to a base station. When a mobile unit has information to transmit over the uplink channel, such as a data burst, the mobile unit may request access to the uplink channel. The mobile unit may then wait to transmit information over the uplink channel until after receiving an access grant from the base station. The access grant may indicate the resources that have been allocated to the mobile unit to transmit the information, such as a timeslot, a channel code, a frequency or tone, and the like. The mobile unit relinquishes the channel once the data burst has been transmitted. Base stations that implement these so-called schedule-on-demand or bandwidth-on-demand schemes may therefore control access to the uplink channel to prevent collisions between different mobile units attempting to transmit over the same uplink channel. The base station may also schedule access to the air interface resources to take advantage of fluctuations in channel conditions.

Although the schedule-on-demand scheme may provide an efficient technique for allocating uplink channel resources for large data bursts that are separated by relatively long periods, such as the data bursts provided by some data services, the efficiency of the schedule-on-demand schemes is significantly reduced for smaller data bursts that are transmitted continuously or with relatively small breaks. For example, conventional voice or Voice over Internet Protocol (VoIP) services require periodic transmission of small amounts of data. A mobile unit that provides a voice service over an uplink channel using a schedule-on-demand scheme must transmit an access grant request for each small burst of voice data. The access grant requests are typically transmitted over a random access channel (RACH). Overhead on the random access channel caused by the access grant requests increases as the number of small data bursts increases and/or the time period between the data bursts decreases. Furthermore, if more than one mobile unit is providing a voice service over the air interface, contention for the random access channel increases, as well as the likelihood of collisions between transmissions by the different mobile units.

Two alternatives to the conventional schedule-on-demand scheme have been proposed. First, an autonomous non-scheduling scheme may be used for periodic data service, such as voice or VoIP services. In the autonomous non-scheduling scheme, the mobile unit simply transmits data when the data becomes available for transmission. Second, a persistent scheduling scheme may be used for some data services. In the persistent scheduling scheme, each mobile unit has a predetermined allocation of uplink resources for transmitting data. For example, each mobile unit may have an uplink channel with predetermined radio resource in time and frequency bands that is available for transmitting data. However both the non-scheduling and the persistent scheduling schemes produce lower spectrum efficiency, as well as reduced frequency and/or time diversity gain, relative to schedule-on-demand schemes. For example, neither the non-scheduling scheme nor the persistent scheduling scheme accounts for fluctuation in the radio channel condition over time or in different frequency bands. Accordingly, the mobile units cannot be scheduled to take advantage of channel selective scheduling gain in time or frequency, which may lead to degradation in the overall throughput of the wireless communication system.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for using uplink reference signals for access grant requests. The method includes determining that at least one mobile unit is requesting access to at least one uplink channel based on information indicative of a change in a masking sequence applied to at least one reference signal. Another embodiment of the present invention includes providing a first reference signal modulated by a first masking sequence to indicate a request for access to at least one uplink channel.

BRIEF DESCRIPTION OF THE DRAWINGS

The invention may be understood by reference to the following description taken in conjunction with the accompanying drawings, in which like reference numerals identify like elements, and in which.

Figure 1:
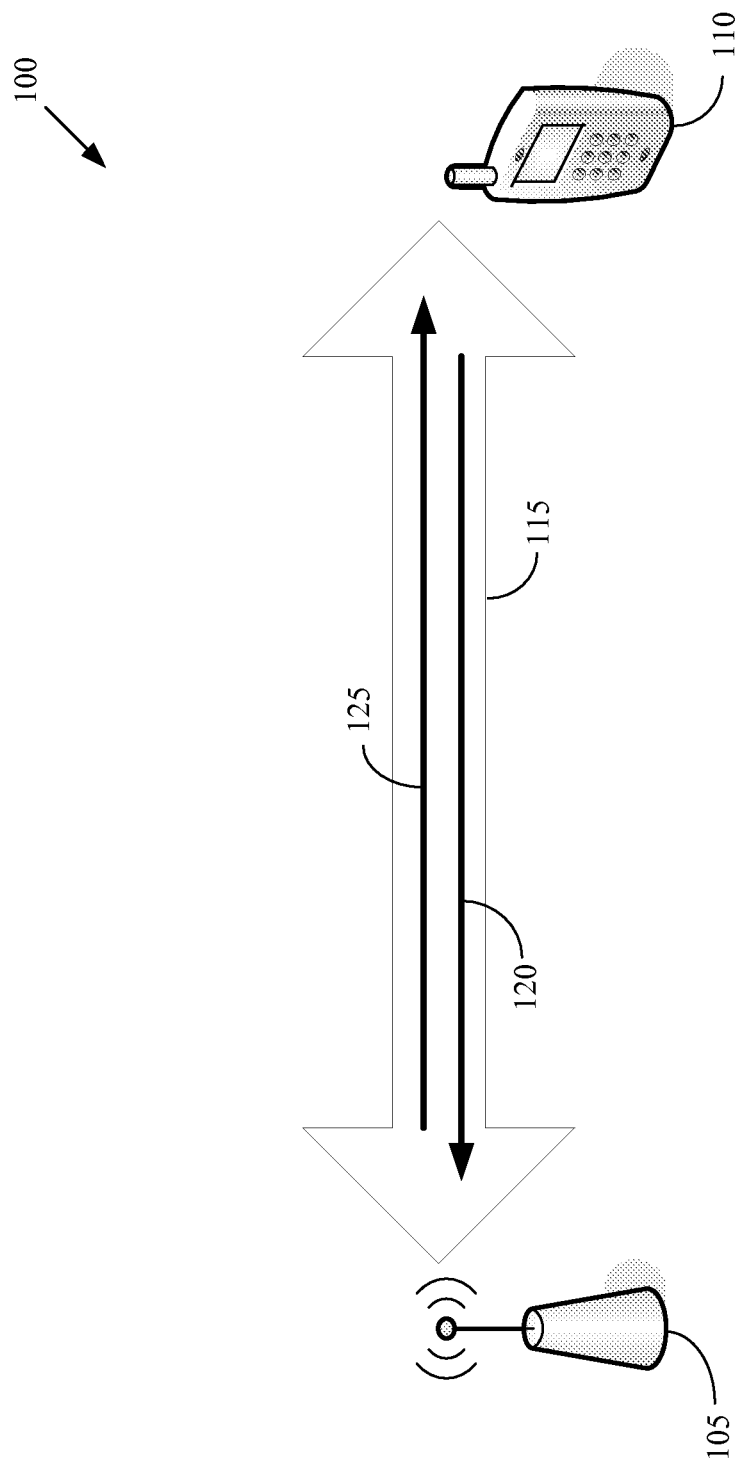
FIG. 1 conceptually illustrates one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 includes a base station 105 that is in communication with one or more mobile units 110 (only one shown in FIG. 1) over a wireless communication link 115. The wireless communication link 115 includes one or more uplink channels 120 and one or more downlink channels 125. The uplink channels 120 and/or the downlink channels 125 may include signaling channels, traffic channels, random access channels, and the like. In the illustrated embodiment, the communication system 100 operates according to the Long Term Evolution (LTE) of the Universal Mobile Telecommunication System (UMTS) standards and/or protocols, as defined by the Third Generation Partnership Project (3GPP, 3GPP2). Accordingly, the uplink and downlink channels 120, 125 are defined and operate according to Single Channel Frequency Division Multiple Access (SC-FDMA) standards and/or protocols. However, persons of ordinary skill in the art having benefit of the present disclosure should appreciate that the present invention is not limited to embodiments that operate according to LTE and/or SC-FDMA. In alternative embodiments, the communication system 100 may operate according to any wireless communication standards and/or protocols.

The base station 105 may be responsible for scheduling access to the channels 120, 125. In one embodiment, the mobile unit 110 periodically provides reference or pilot signals over one of the uplink channels 120. The reference signals may be received by the base station 105 and used for channel quality estimation. Accordingly, the reference signals may be referred to as CQI references. The arrival time for uplink traffic from the mobile unit 110 to the base station 105 is typically not known in advance and the CQI references should be available for the UL scheduler logic in the base station 105 before the traffic arrives (and an uplink access grant request is sent by the mobile unit 110 to request access to one or more uplink channels) in order to maximize the frequency and time selective scheduling gain. The mobile unit 110 may therefore provide reference signals periodically so that the scheduler in the base station 105 can track the quality of the radio channels 120, 125 associated with the mobile unit 105 on a substantially continuous basis. For example, the mobile unit 110 may provide reference signals every few milliseconds so that the scheduler can track the quality of the radio channels 120, 125 substantially continuously.

The mobile unit 110 may request access to one or more of the uplink channels 120 to transmit data to the base station 105. For example, if an application supported by the mobile unit 110, such as a data application and/or a voice application, has information that is to be transmitted to the base station 105, the mobile unit 110 may request access to one or more of the uplink channels 120 for transmitting the information to the base station 105. To indicate the access grant request, the mobile unit 110 may modify a masking sequence that is used to modulate one or more of the reference signals. For example, the mobile unit 110 is transmitting reference signals that are modulated using a first masking sequence. When the mobile unit 110 determines that there is data available for transmission over the uplink channel(s) 120, the mobile unit 110 may switch to a second masking sequence that is used to modulate subsequent reference signals, thereby indicating that the mobile unit 110 is requesting access to the uplink channels 120.

In one embodiment, the masking sequences are chosen to have constant, low cyclic cross-correlation between the masking sequences, as well as other properties. For example, Zadoff-Chu sequences may be used to form the masking sequences because they have unit magnitude for equal channel sounding, an optimal cyclic auto-correlation property, and low, constant cyclic cross-correlation property. A Zadoff-Chu sequence $c_p(n)$ of length P is generated as $$c_p(n) = \begin{cases} \exp\left[\frac{j2\pi p}{P}\left(n + \frac{n(n+1)}{2}\right)\right] & \text{for } P \text{ odd} \\ \exp\left[\frac{j2\pi p}{P}\left(n + \frac{n^2}{2}\right)\right] & \text{for } P \text{ even} \end{cases} \quad \text{(Eq. 1)}$$

where $j=\sqrt{-1}$. The constant, low cyclic cross-correlation property may be used for co-channel interference mitigation in case of collisions between reference signals transmitted by different mobile units 110. The full-length sequence has the capability to suppress the interference by up to 21.8 dB. Although shorter sequences may not have these very low cross correlation values, most of the gain may still be obtained with shorter sequences.

The base station 105 may then determine that the mobile unit 110 is requesting access to one or more uplink channels 120 by detecting a change in the masking sequence used to modulate one or more reference signals. In one embodiment, the base station 105 may use detection of a transition between two Zadoff-Chu sequences as an indication of an uplink access grant request from the mobile unit 110. For example, each mobile unit 110 that has an active communication link 115 with the base station 105 may be assigned a pair of Zadoff-Chu sequences. One of the Zadoff-Chu sequences is used to modulate CQI reference signals when the data burst is on and the other Zadoff-Chu sequence is used to modulate CQI reference signals when the data burst is off. The mobile unit 110 may therefore choose the appropriate Zadoff-Chu sequence based on data availability in one or more buffers in the mobile unit 110. In one embodiment, the base station 105 may perform hypothesis testing of two Zadoff-Chu sequences before the sequence decoding.

The masking sequences that are assigned to the mobile units 110 may be determined by a trade off between different considerations. In one embodiment, two arbitrary Zadoff-Chu sequences could be assigned to each mobile unit 110. Assigning two different sequences to each mobile unit 110 may improve the detection probability and/or the reliability of hypothesis testing between two distinct Zadoff-Chu sequences in time transition. However, this approach reduces the available number of Zadoff-Chu sequences in half. Alternatively, the pair of masking sequences may include a Zadoff-Chu sequence, $c_p(n)$, and its inverse, $-1*c_p(n)$, as a pair so that a sequence and its inverse are used to modulate the CQI (Channel Quality Indication) reference signals while the data burst is on and off, respectively. The drawback of this scheme is that the detection probability decreases as the Doppler frequency increases.

Once the base station 105 determines that the mobile unit 110 is requesting access to one or more uplink channels 120, a scheduler in the base station 105 allocates bandwidth on one or more of the uplink channels 120. In one embodiment, the bandwidth allocation is implicit. For example, some applications, such as VoIP, are allocated a steady data rate once the data burst is arrived. Thus, bandwidth request signaling information does not need to be explicitly provided to the scheduler for the bandwidth allocation. However, in some cases, explicit the signaling of the bandwidth allocation can be provided to the scheduler. For example, the base station 105 could assign the physical resources for higher layer signalling once the base station 105 detects the access grant request from the mobile unit 110. The follow-up higher layer signalling would allow the scheduler to allocate proper bandwidth for the mobile unit 110.

Figure 2:
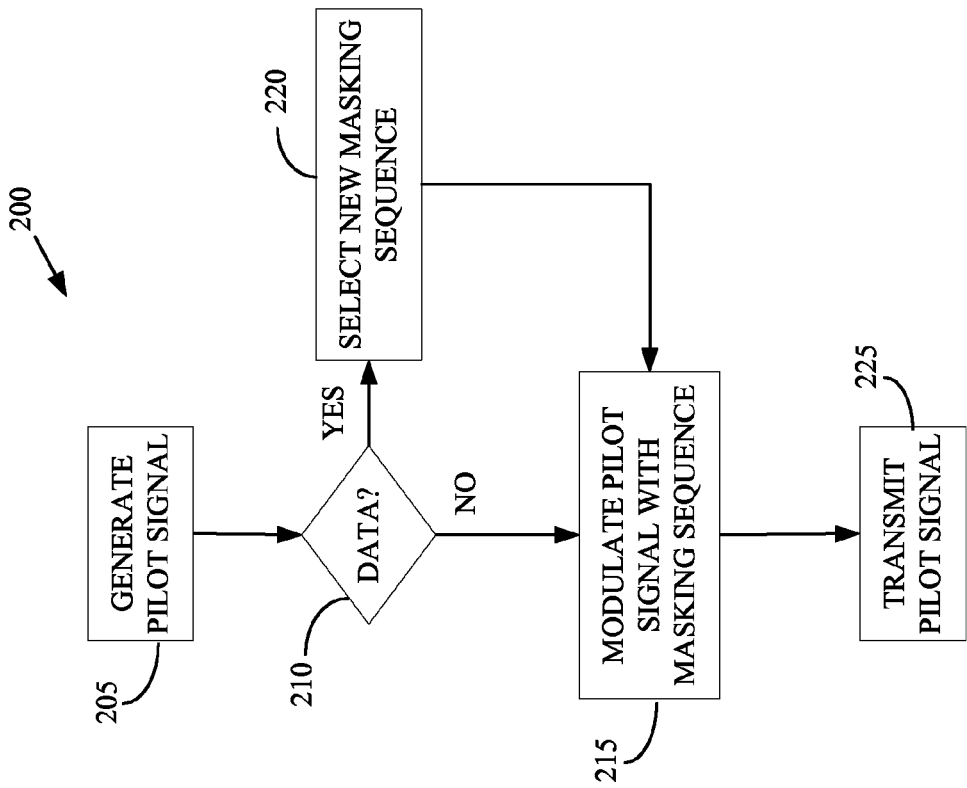
FIG. 2 conceptually illustrates one exemplary embodiment of a method of providing reference signals that are indicative of a request for access to at least one uplink channel, in accordance with the present invention.

FIG. 2 conceptually illustrates one exemplary embodiment of a method 200 of providing reference signals that are indicative of a request for access to at least one uplink channel. In the illustrated embodiment, the reference signal is generated (at 205) by the mobile unit. The mobile unit then determines (at 210) whether or not data is available for transmission over an uplink channel. If the mobile unit determines (at 210) that no data is currently available for transmission, and the mobile unit may modulate (at 215) the reference signal with a first masking sequence. However, if the mobile unit determines (at 210) that data is available for transmission over the uplink channel, then the mobile unit selects (at 220) a second masking sequence that is different than the first masking sequence. The mobile unit may then modulate (at 215) the reference signal with the second masking sequence to indicate that data is available for transmission over the uplink channel. The modulated reference signal may then be transmitted (at 225) over an air interface towards a base station.

Figure 3:
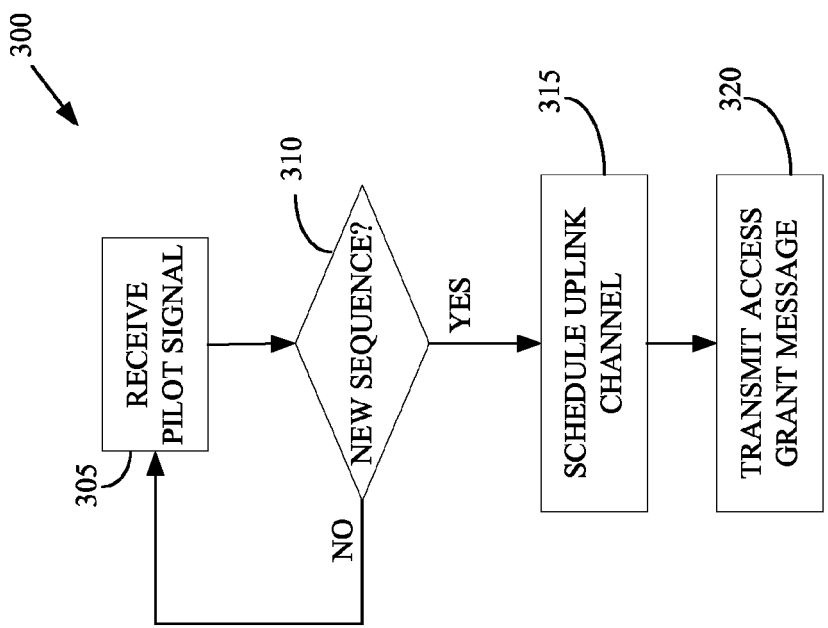
FIG. 3 conceptually illustrates one exemplary embodiment of a method of receiving reference signals that are indicative of a request for access to at least one uplink channel, in accordance with the present invention.

FIG. 3 conceptually illustrates one exemplary embodiment of a method 300 of receiving reference signals that are indicative of a request for access to at least one uplink channel. In the illustrated embodiment, the base station receives (at 305) a reference signal from a mobile unit. The base station then determines (at 310) whether or not the masking sequence used to modulate the reference signal indicates that the mobile unit is requesting access to one or more uplink channels. For example, the base station performs a hypothesis test (at 310) every time it receives the reference signal to determine whether the masking sequence used to modulate the current reference signal is the same or different than the masking sequence used to modulate one or more previous reference signals. If the base station determines (at 310) that the sequence is not a new sequence, and the base station continues the hypothesis test for the subsequent (at 305) reference signals. However, if the base station determines (at 310) that the sequence is a different sequence, indicating that the mobile station is requesting access to one or more uplink channels, and the base station may schedule (at 315) one or more uplink channels and transmit (at 320) a message indicating that access to the uplink channel has been granted. The access grant message may also include information that may be used to indicate the resources of the uplink channel (e.g., time slots and/or frequencies) that have been allocated to the mobile unit.

Embodiments of the techniques described above for indicating a request for access to an uplink channel may have a number of advantages over the conventional practice of transmitting access grant request messages over random access channels. For example, the probability of a false detection of an access grant request may be reduced, particularly when a pair of different Zadoff-Chu sequences is used to modulate reference signals and indicate the access grant request. The techniques described herein may also reduce bandwidth occupancy at least in part because the access grant request as indicated using uplink signals (e.g., the periodic reference signals) that are already in use for other purposes, such as a channel quality estimation. The grant request delay after the uplink traffic arrival may also be reduced relative to bandwidth-on-demand techniques. The techniques described herein may also increase system control of multiple access schemes for UL access grant requests.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
   determining, at a base station, that at least one mobile unit is requesting access to at least one uplink channel by detecting a change in a masking sequence applied to at least one reference signal transmitted from said at least one mobile unit to the base station.

2. The method of claim 1, comprising accessing information indicative of a first masking sequence applied to a first reference signal transmitted during a first time period and information indicative of a second masking sequence applied to a second reference signal transmitted during a second time period subsequent to the first time period.

3. The method of claim 2, wherein accessing information indicative of the first and second masking sequences comprises accessing information indicative of a first and second masking sequences having constant, low cyclic cross-correlation between the first and second masking sequences.

4. The method of claim 3, wherein accessing information indicative of the first and second masking sequences comprises accessing information indicative of first and second Zadoff-Chu sequences.

5. The method of claim 4, wherein accessing information indicative of the first and second Zadoff-Chu sequences comprises accessing information indicative of two arbitrary Zadoff-Chu sequences.

6. The method of claim 4, wherein accessing information indicative of the first and second Zadoff-Chu sequences comprises accessing information indicative of a Zadoff-Chu sequence and an inverse of the Zadoff-Chu sequence.

7. The method of claim 2, wherein determining that said at least one mobile unit is requesting access to said at least one uplink channel comprises determining that said at least one mobile is requesting access to said at least one uplink channel in response to determining that the first masking sequence is different from the second masking sequence.

8. The method of claim 1, comprising providing at least one of an implicit and an explicit indication of bandwidth allocation in response to determining that said at least one mobile unit is requesting access to said at least one uplink channel.

9. The method of claim 1, comprising providing at least one access grant indicating that the mobile unit has been granted access to said at least one uplink channel.

10. A method, comprising:
    providing, from a mobile unit to a base station, a first reference signal modulated by a first masking sequence that changes so that the change in the first masking sequence indicates a request for access to at least one uplink channel supported by the base station.

11. The method of claim 10, wherein providing the first reference signal modulated by the first masking sequence comprises providing the first reference signal modulated by the first masking sequence during a first time period, the first masking sequence differing from a second masking sequence applied to a second reference signal provided during a second time period.

12. The method of claim 11, wherein providing the first and second reference signals modulated by the first and second masking sequences, respectively, comprises providing first and second reference signals modulated by first and second masking sequences having constant, low cyclic cross-correlation between the first and second masking sequences.

13. The method of claim 12, wherein providing the first and second reference signals modulated by the first and second masking sequences, respectively, comprises providing first and second reference signals modulated by first and second Zadoff-Chu sequences, respectively.

14. The method of claim 13, wherein providing the first and second reference signals modulated by the first and second masking sequences, respectively, comprises providing first and second reference signals modulated by two different arbitrary Zadoff-Chu sequences.

15. The method of claim 13, wherein providing the first and second reference signals modulated by the first and second masking sequences, respectively, comprises providing first and second reference signals modulated by a Zadoff-Chu sequence and an inverse of the Zadoff-Chu sequence.

16. The method of claim 10, wherein providing the first reference signal modulated by the first masking sequence comprises providing the first reference signal modulated by the first masking sequence in response to determining that data is available for transmission over said at least one uplink channel.

17. The method of claim 10, comprising receiving at least one access grant indicating that access to said at least one uplink channel has been granted.

18. The method of claim 17, comprising providing data over said at least one uplink channel in response to receiving said at least one access grant.

19. A method, comprising:
    detecting, at a base station, a change in a masking sequence applied to a reference signal transmitted from a mobile unit, wherein the change in the masking sequence signals to the base station that the mobile unit is requesting access to at least one uplink channel to the base station.

20. A method, comprising:
    changing, at a mobile unit, a masking sequence that modulates a first uplink signal so that the change in the masking sequence signals a request for access to at least one uplink channel supported by a base station.

* * * * *